United States Patent [19]

Ghisler

[11] Patent Number: 5,634,193
[45] Date of Patent: May 27, 1997

[54] METHOD OF LOCATING A MOBILE STATION IN A MOBILE TELEPHONE SYSTEM HAVING INDOOR AND OUTDOOR BASE STATIONS

[75] Inventor: Walter Ghisler, Upplands Väsby, Sweden

[73] Assignee: Telefonaktiebolaget LM Ericsson, Stockholm, Sweden

[21] Appl. No.: 638,201

[22] Filed: Apr. 26, 1996

Related U.S. Application Data

[63] Continuation of Ser. No. 381,464, Jan. 31, 1995, abandoned, which is a continuation of Ser. No. 35,801, Mar. 23, 1993, abandoned.

[30] Foreign Application Priority Data

Mar. 24, 1992 [SE] Sweden .................. 9200914

[51] Int. Cl.⁶ ........................................ H04Q 7/22
[52] U.S. Cl. .................. 455/33.2; 455/33.4; 455/34.1; 455/54.2; 455/56.1; 379/60
[58] Field of Search .................... 455/34.1, 34.2, 455/33.1, 33.2, 33.3, 33.4, 54.1, 54.2, 56.1, 62; 379/59, 60

[56] References Cited

U.S. PATENT DOCUMENTS

| | | | |
|---|---|---|---|
| 4,144,411 | 3/1979 | Fuenkiol | 379/59 X |
| 4,790,000 | 12/1988 | Kiroshita | 379/59 |
| 4,955,082 | 9/1990 | Hattori et al. | 455/33 |
| 5,042,082 | 8/1991 | Dahlin | 455/67.1 X |
| 5,128,959 | 7/1992 | Bunckert | 455/33.2 X |
| 5,235,632 | 8/1993 | Raith | 379/59 |

FOREIGN PATENT DOCUMENTS

| | | |
|---|---|---|
| 0225607 | 12/1986 | European Pat. Off. . |
| 0388034 | 9/1990 | European Pat. Off. . |
| 0452290 | 10/1991 | European Pat. Off. . |
| 86/06915 | 11/1986 | WIPO . |

*Primary Examiner*—Reinhard J. Eisenzopf
*Assistant Examiner*—Philip J. Sobutka
*Attorney, Agent, or Firm*—Burns, Doane, Swecker & Mathis, L.L.P.

[57] ABSTRACT

A mobile telephone system has in a cell a base station and sub-stations which are connected to a mobile switching center. The mobile telephone system has control channels and frequencies which are time divided to traffic channels. Some of the frequencies are selected as identification frequencies. Each of the sub-stations is assigned a unique set of frequencies from among the identification frequencies and constantly transmit their respective frequency set. A mobile station connected to the base station listens to the identification frequencies and reports the strongest of these frequencies to the mobile switching center. The mobile switching center compares the reported frequencies with the unique set of frequencies, compares the reported signal strength with a threshold value and selects the nearest sub-station for handoff. The mobile switching center switches from the base station to a connection with the sub-section. The mobile station continues to listen to the identification frequencies and reports the signal strength on its connection. When the strength of the signals from the selected sub-station is low, the connection is switched back to the base station.

4 Claims, 3 Drawing Sheets

METHOD OF LOCATING A MOBILE STATION IN A MOBILE TELEPHONE SYSTEM HAVING INDOOR AND OUTDOOR BASE STATIONS

This application is a continuation of application Ser. No. 08/381,464, filed Jan. 31, 1995, now abandoned, which is a continuation of application Ser. No. 08/035,801, filed Mar. 23, 1993, now abandoned.

BACKGROUND

The present invention pertains to a method relating to a mobile telephone system, comprising locating a mobile station (MS), which mobile telephone system includes base stations (BS1, MT) which are connected to a mobile switching center (MSC) and to which a desired number of frequencies have been allocated.

Known mobile telephony systems which use TDMA, that is to say Time Division Multiple Access, and MAHO, that is to say Mobile Assisted Handoff, have in each base station a control channel whose signal strength can be measured by the mobile stations and whose frequency permits identification within a given geographical area of the transmitting base station. Examples of such systems are the European GSM-system and the American system which is specified according to a standard designated EIA/TIA IS-54. The land system can order the mobile station to measure and report the signal strength on given frequencies, which makes it possible to identify those base stations which lie closest to the mobile station.

There has been proposed in U.S. patent application Ser. No. 07/680,508 a mobile telephone system which is intended for use by subscribers both indoors and outdoors. The system includes an external part-system and an internal part-system. Adaptive channel assignment is applied in the internal part-system, which provides indoor users access to all traffic channels in the system. The transmitter powers are small in comparison with the transmitter powers in the external part-system, which enables the same traffic channels to be used in several cells within a building. The control channel belonging to each cell indoors is not adaptive but is fixed and, in a manner similar to that for the outdoor cells, identifies the base station of the mobile station. This mobile system includes a large number of indoor base stations. The fixed control channel is a drawback, since it can easily be subjected to disturbances from the outdoor system and is then not changed adaptively. Furthermore, it is difficult for the land system to clearly identify an indoor base station for handoff on the basis of the frequency of the control channels when a subscriber reports measurements made on the control channels of peripheral base stations during a call. This difficulty can occur when the subscriber chooses to pass from a street in a given outdoor cell into one of several possible buildings. The indoor base stations in these buildings must then be clearly defined in the reported measurements from the mobile, which requires the control channel frequencies in all of these buildings to be different.

SUMMARY

The present invention is based partly on the realization that fixed indoor base station control channels in the aforesaid adaptive indoor system are subjected to disturbances and partly on the realization that it should be possible to safely identify the indoor base stations with a starting point from the measurements reported from the mobile station.

It is an object of the present invention to provide indoor base stations, hereinafter referred to as substations, which have only traffic channels and no control channels.

Another object of the invention is to solve the problem of sub-station identification, by reserving to this end a number of frequencies from among all those available to the mobile system. Each of the sub-stations within a geographic area is assigned a unique set of these reserved frequencies which are constantly radiated. Although this assignment may be permanent it is preferably semi-permanent and commanded by the mobile switching center of the system. This enables attention to be paid to local disturbance conditions and the need of changes or modifications in conjunction with extending the mobile telephone network. In addition to using the identification frequencies in a cell for identification purposes, these frequencies can also be used to carry traffic in the cell.

BRIEF DESCRIPTION OF THE DRAWINGS

An exemplifying embodiment of the invention will now be described in more detail with reference to the accompanying drawings, in which.

DETAILED DESCRIPTION

Figure 1:
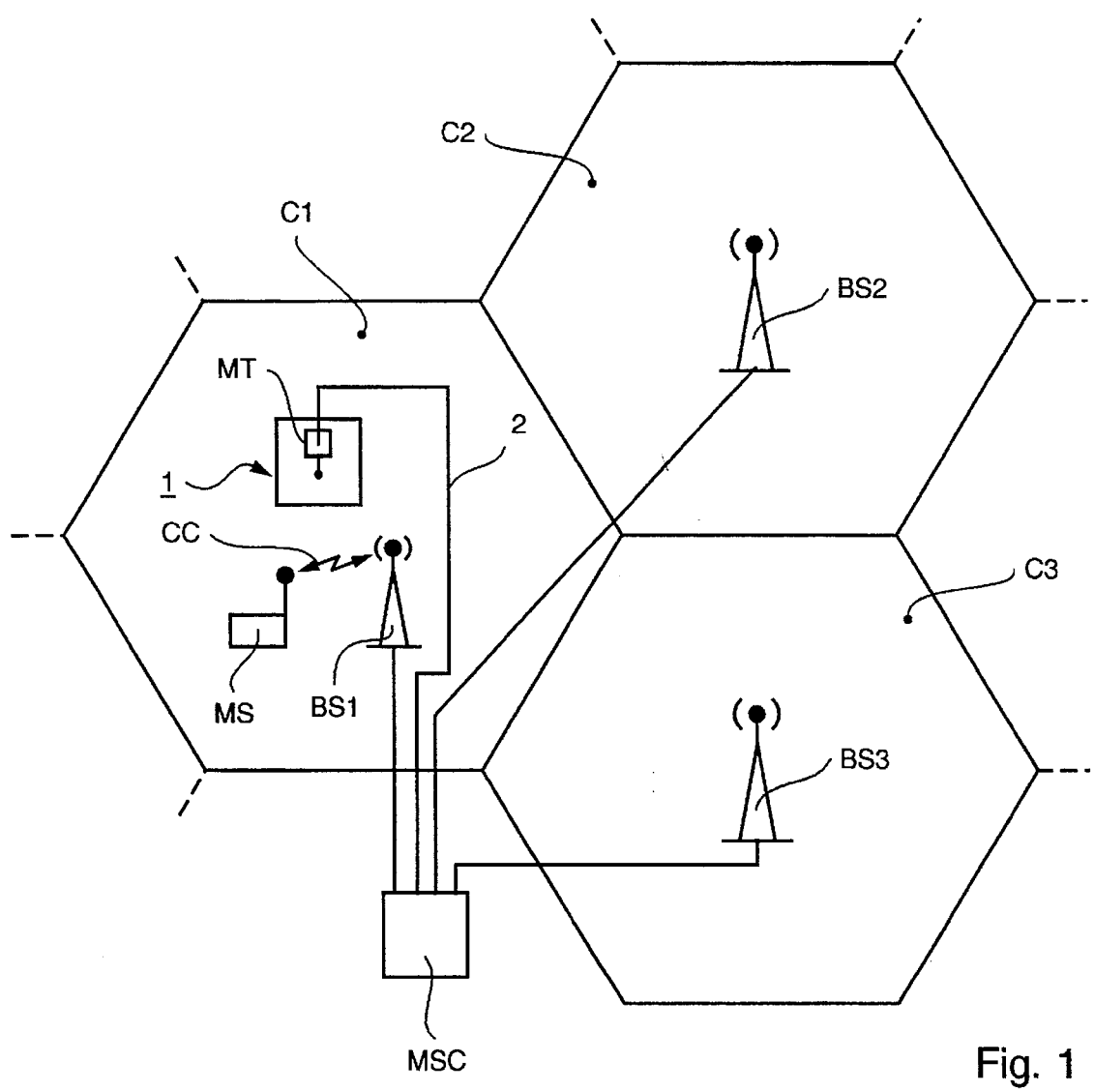
FIG. 1 is a schematic illustration of a cellular mobile telephone system.

FIG. 1 illustrates a part of a cellular mobile telephony system having cells C1, C2 and C3. Each of the cells has a base station BS1, BS2 and BS3 respectively, which are connected to a mobile switching center MSC. The cell C1 accommodates a building 1 in which sub-stations generally referenced MT are installed and which are connected to the mobile switching center MSC by means of a cable 2. A subscriber who is able to make calls through the mobile telephone system from a mobile station MS moves in the cell C1.

It is desirable to enable the subscriber to make a call both from outdoors and from within the building 1. It should also be possible to make the call or to carry on a conversation when the mobile station is moved into or out of the building without the subscriber needing to reconnect the call manually. The mobile telephony system should have a low disturbance level even on control channels and prior to handoff should obtain a clear localization of mobile stations both indoors and outdoors. These desiderata are fulfilled by a mobile telephony system according to the present invention.

Figure 2:
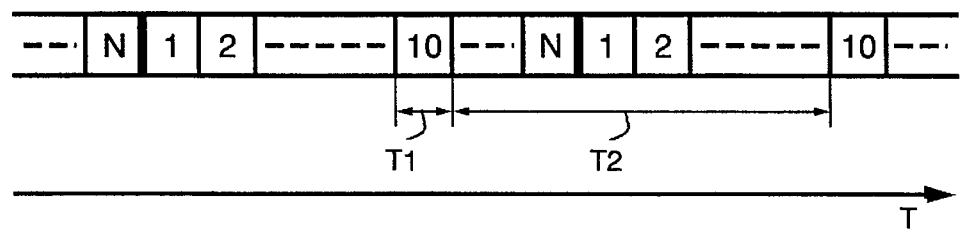
FIG. 2 illustrates time slots for time shared radio transmission.

The mobile telephony system illustrated in FIG. 1 would be allocated by the authorities a frequency range which would be divided into a number of frequencies, or individual frequency pairs, whose one frequency is used for communication from the base stations or sub-stations to the mobile station MS, so-called downlink, and whose other frequency is used in the reverse direction, so-called uplink. Each frequency is divided into a number of time slots for individual calls in a known manner, normally referred to as TDMA, Time Division Multiple Access. In the present application, the term traffic channel is meant to identify one such time slot on a given frequency. FIG. 2 illustrates the regularly appearing time slots 1–N for one of the frequency pairs. The reference T identifies time and reference T1 identifies the duration of a time slot, in the illustrated embodiment the time slot 10. T2 indicates a time interval between two occasions on which the time slot 10 is transmitted. For calls and the establishment of connections, the mobile telephone system includes control channels CC which lack time slots and which take-up a complete frequency, for instance such as in the aforesaid American standards EIA/TIA IS-54.

It should be noted that the termchannel is sometimes used in radio contexts to designate an interspace between a transmitter and a receiver. This meaning of the word channel is not used in the present application.

Figure 3:
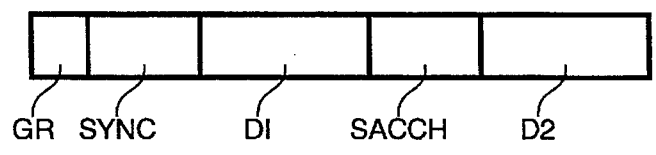
FIG. 3 illustrates a signal sequence transmitted in a time slot.

FIG. 3 illustrates a known signal sequence which is transmitted in the time slots. The signal sequence is divided into a start sequence GR, a synchronizing sequence SYNC, two data sequences D1 and D2 and an associated control sequence SACCH, which is a reserved signal space for control signals. In the aforesaid American mobile telephone standard EIA/TIA IS-54, time slots of corresponding composition are specified.

Figure 4:
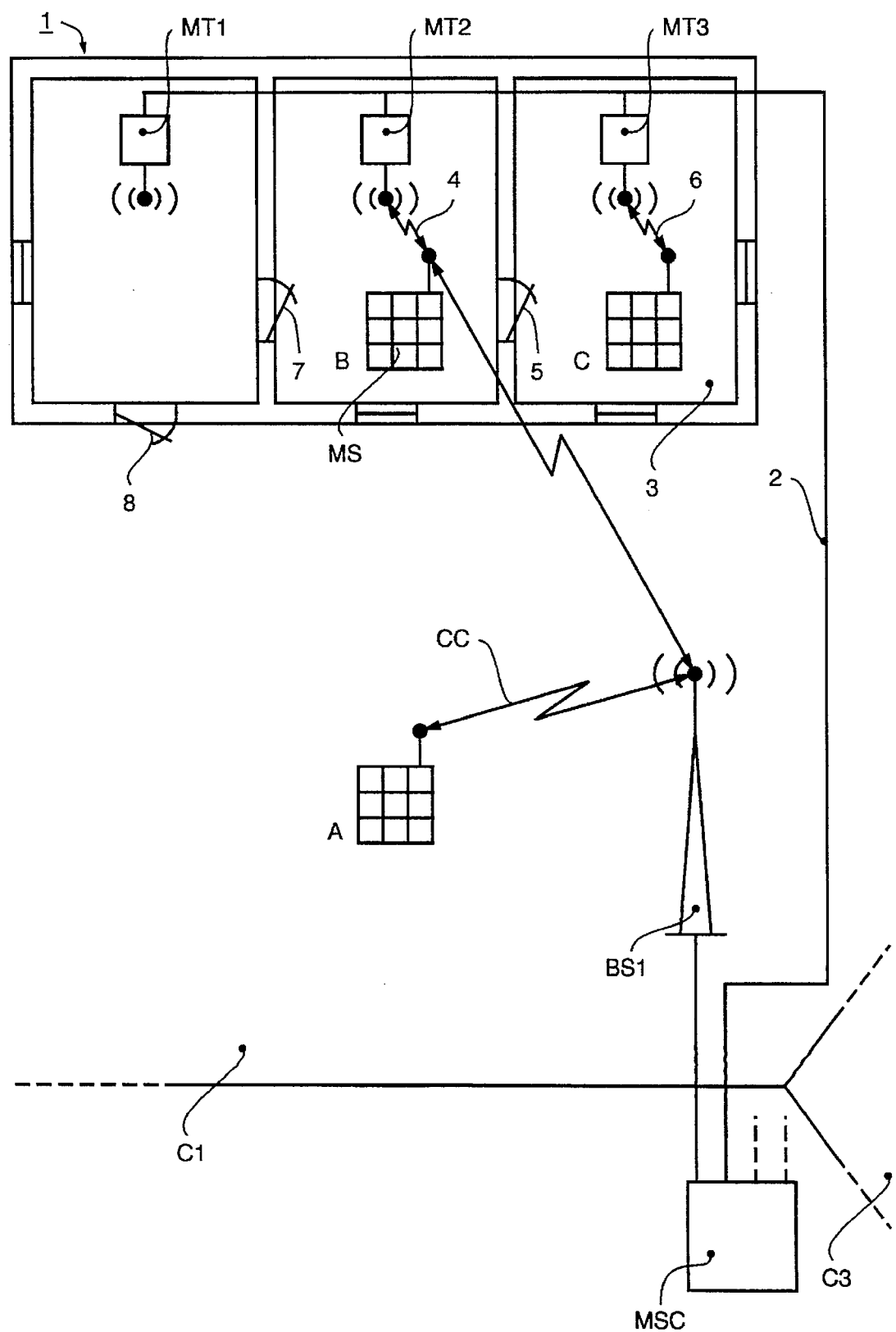
FIG. 4 illustrates a base station and sub-stations in a building.

FIG. 4 illustrates the base station BS1 and the building 1 in the cell C1 in more detail. The building has three rooms 3 each provided with a sub-station MT1, MT2 and MT3 respectively, these sub-stations being connected to the mobile switching center MSC by the cable 2. The mobile station MS is shown in three different positions, referenced A, B and C respectively. The base station BS1 has access to all of the system traffic channels, which are assigned adaptively, and a full frequency which is the control channel CC. The mobile station MS calls the base station BS1 with the aid of the control channel CC, and the mobile switching center MSC assigns a call channel with the aid of the control channel. When shifting channels, a command for a new call channel is sent on the old call channel. These functions are carried out in a known manner, for instance in accordance with the aforesaid American mobile telephone standard, which only recites three time slots, however, instead of the number N illustrated in FIG. 2. The number N of time slots is used to describe the present invention, which is not limited to the American mobile telephone standard.

According to the invention, the sub-stations MT1, MT2 and MT3 are simplified base stations having a few transmitters/receivers. The sub-stations lack control channels but are able to transmit and receive on the various traffic channels of the mobile telephone system. Of all the traffic channel frequencies utilized by the mobile system and to which the base station BS1 has access, a given number are reserved for identification purposes. In the case of the illustrated embodiment, thirty frequencies referenced No1 up to and including No30 are reserved. Each of the sub-stations MT1, MT2 and MT3 are assigned a unique set from among these thirty frequencies, wherein each set includes five frequencies. Each of the sub-stations constantly transmits its five assigned frequencies and because these frequencies constitute a unique frequency set for each sub-station, the sub-stations neighbouring the mobile station MS can be identified by the mobile switching center MSC. In general, this identification is effected by the mobile station MS measuring the signal strength of the thirty reserved frequencies and reporting the five strongest signals to the mobile switching central MSC. This enables the base station BS1 to command the mobile station MS when it is located indoors to handover to the nearest located sub-station. This handoff procedure will be described in more detail herebelow.

In addition to its respective unique frequency set, the sub-stations MT1, MT2 and MT3 have access to traffic channels for calls. These channels may be permanently assigned. According to the illustrated exemplifying embodiment of the invention, the traffic channels are subsequently assigned adaptively by the mobile switching center MSC. It should be noted that in the case of adaptive channel assignment those frequencies which belong to the unique frequency set of a sub-station for identification purposes may also be used by this sub-station as a traffic channel frequency.

In the case of the illustrated exemplifying embodiment, the following unique frequency sets may be made for the sub-stations.

MT1: frequency No1, No2, No3, No4, No5.
MT2: frequency No1, No3, No4, No5, No6.
MT3: frequency No1, No4, No5, No6, No7.

It should be noted that the frequency No1 is common to the sub-stations. The strength of the indoor signals arriving from the sub-stations MT1, MT2 and MT3 are generally greater than the strength of the outdoor signals arriving from the base station BS1, because of the relatively short indoor distances. As will be described in more detail herebelow, the mobile switching center MSC can determine whether the mobile station MS is located outdoors or within the building, by comparing the strength of the frequency No1 with a threshold value. The frequency assignment permits a large number of sub-stations within the mobile telephone system to be identified. According to the illustrated embodiment, 29!/25!·4!=23751 unique frequency sets can be made. The exclamation mark signifies the factorial in the usual way.

Figure 5:
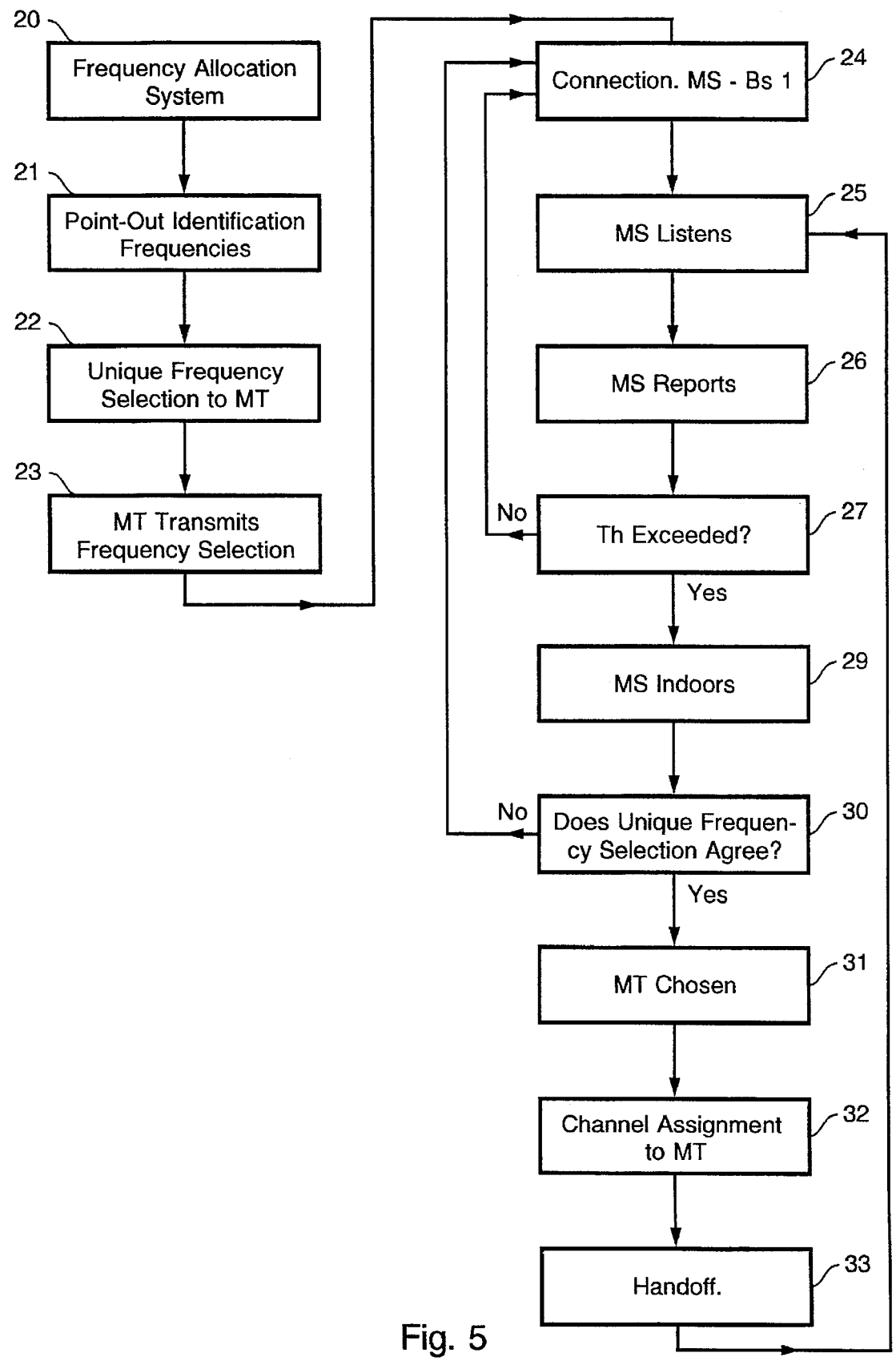
FIG. 5 is a flow chart illustrating the inventive method.

The manner in which the inventive mobile telephone system operates will be described with reference to the flow chart of FIG. 5. As beforementioned, the frequencies are assigned to the mobile telephone system in accordance with a block 20, and the identification frequencies No1–No30 are pointed out, block 21. In block 22 the respective selected unique frequency sets are assigned to the sub-stations MT1, MT2 and MT3 and the sub-stations transmit these frequencies, as illustrated by block 23. When the mobile station MS is located in cell C1 and itself makes a call or is called by another subscriber, the mobile switching center MSC assigns one of its free traffic channels to the base station BS1, for instance the first time slot on a frequency No36. This channel division, illustrated in block 24, is effected in a known manner and the mobile station MS commences its call on the assigned traffic channel. The mobile switching center MSC orders the mobile station MS, via base station BS1, to listen to the frequencies of neighbouring base stations and sub-stations, in accordance with a block 25. The mobile station reports the signal strength of the five strongest frequencies to the base station BS1 on the associated control sequence SACCH of the assigned traffic channel, block 26. In block 27, the mobile switching center MSC receives the measurements concerning these frequencies and compares the reported signal strengths with a threshold value Th. When the signal strength of the common frequency No1 is beneath the threshold value Th or when the frequency No1 is not detected at all, an alternative "No", the mobile station MS is probably located outdoors, for instance in position A. In this way, the mobile switching center MSC locates the mobile station with the aid of the signal strength of the common frequency No1. In this case, according to the "No" alternative the connection to the base station BS1 continues on the assigned traffic channel, the first time slot on the frequency No36. On the other hand, when the signal strength of the common frequency No1 exceeds the threshold value Th, in accordance with a "Yes" alternative in block 27, the mobile station MS is probably located indoors in accordance with block 29, for instance in position B. In this case, the mobile station MS reports the frequency No1, No3, No4, No5 and No6 on the associated control frequency SACCH of the assigned traffic channel, the first time slot on the frequency 36. The mobile switching center MSC thus first localizes the mobile station MS indoors with the aid of the signal strength of the common frequency No1. According to the block 30, the mobile switching center MSC then ascertains whether or not the reported frequencies coincide with one of the unique frequency sets. In the case of an alternative "Yes", the mobile switching center MSC locates the mobile station MS at the sub-station MT2 according to block 31. MT2 is identified with the aid of the reported frequencies No3, No4, No5 and No6. According to block 32, the mobile switching center MSC assigns a free channel to a connection 4 (see FIG. 4) between the mobile station MS and the sub-station MT2. This is effected by pointing-out, for instance, the time slot 10 of a frequency No35. The mobile switching center then orders handoff, in accordance with block 33. This handoff is effected from the earlier assigned traffic channel, the first time slot on the frequency No36, to the channel pointed-out, the time slot 10 of the frequency No35. When the connection 4 has been established, the sub-station MT2 communicates with the mobile switching central MSC over the cable 2. In the case of an alternative "No" in block 30, the mobile station MS continues to communicate via the base station BS1, according to block 24, and listens on the identification frequencies, according to block 25.

While the call is in progress it is possible that the mobile station MS may move through a door 5 to the position C in the adjacent room 3 shown in FIG. 4. The mobile station MS continues to listen to the frequencies No1–No30 according to block 25, as the call on the connection 4 continues. This listening process takes place during time interval T2 between the occasions on which the time slot 10 reappears, in accordance with FIG. 2. In accordance with block 26, the mobile station MS reports to the mobile switching center MSC, via the sub-station MT2, the five strongest signals on the associated control frequency SACCH of the allocated traffic channel, the time slot 10 of the frequency No35. At some point as the mobile station MS passes through the door 5, it will report the strongest frequencies No1, No4, No5, No6 and No7 to the mobile switching center MSC. This frequency set does not belong to the sub-station MT2. In accordance with the "No" alternative in block 30, the mobile switching center orders the base station BS1 and the mobile station MS to handover to a free traffic channel in the cell C1 of BS1, for instance the second time slot of a frequency No49. The mobile station MS constantly reports the strongest frequencies No1, No4, No5, No6, and No7, which now takes place on the associated control frequency SACCH of the second time slot, the frequency No49. If the signal strength of the frequency No1 exceeds the threshold value Th, the block 27, the mobile switching center will locate the mobile station MS indoors, the block 29. MS is also located as being in the vicinity of the sub-station MT3, with the aid of its unique frequency set, as described above with reference to blocks 30 and 31. A connection 6 between the sub-station MT3 and the mobile station MS is assigned one of the free traffic channels of this sub-station, block 32, for instance the third time slot of the frequency No37, and the mobile station MS makes a handoff to this traffic channel in accordance with block 33.

In the case of the illustrated example, when changing rooms, handoff is effected from the sub-station MT2 to the base station BS1, which thereafter makes a handoff to the sub-station MT3. This reduces the risk of losing the call during the sub-station exchange process. However, according to one alternative embodiment of the invention it is possible to make handoff directly from one sub-station to another. This method can be applied when the reported signal strengths of the identification frequencies of the new sub-station MT3 exceed the signal strengths of the old sub-station MT2. In this case it is suitable that the unique frequency sets differ from one another by more than one frequency number.

The mobile station MS can move out of the building 1 through the door 5 and doors 7 and 8. In this case the connection is subsequently switched between the base station BS1 and the sub-stations MT3, MT2, and MT1, in accordance with what has been described above. As the mobile station MS passes through the door 8, the base station BS1 takes over the connection on one of its own traffic channels, for instance the second time slot of a frequency No42. The mobile station MS reports the five strongest frequencies on the associated control sequence SACCH of this channel. In this case, the strength of the common frequency No1 will lie beneath the threshold value Th, alternative "No" in block 27. The base station BS1 therewith locates the mobile station MS outdoors and the connection with the base station BS1 continues on the second time slot of the frequency No42, in accordance with block 24.

This frequency allocation to the sub-stations can be effected so that only a subset of the reported frequencies need coincide with a subset of the unique frequency sets of the sub-stations. This frequency set may be made in the following manner, for instance:
MT1: frequency No1, No2, No3, No4, No5
MT2: frequency No1, No6, No7, No8, No9
MT3: frequency No1, No10, No11, No12, No13

For example, on one occasion the mobile station MS reports the frequencies No1, No9, No10, No11, No12. The mobile switching center MSC is able to locate the mobile MS as being indoors by the frequency No1. On the basis of a majority decision on the frequencies No10, No11 and No12, the mobile switching center MSC is able to locate the mobile station MS to the sub-station MT3 and assign the connection to one of the channels of this station.

When a relatively small number of frequencies has been reserved for locating purposes, localization of the mobile station MS can be divided into several periods. This enables a large number of sub-stations to be identified with the aid of their respective unique frequency sets in accordance with the following example. The cell C2 has been allocated eleven numbered frequencies for locating purposes. The unique frequency sets for the sub-stations in this cell are comprised of a common frequency and two frequencies that are transmitted during a first locating period and two frequencies that are transmitted during a second locating period. This method enables a number $(10!/2!\cdot 8!)^2=2025$ different sub-stations to be identified, despite the small number of frequencies reserved. The unique frequency set is thus divided into two part-sets, each of which is transmitted during a respective one of the locating periods.

In the illustrated exemplifying embodiment of the invention described above, the sub-stations MT1, MT2 and MT3 lack control channels, whereas the base station BS1 alone has the control channel CC for identifying itself to the mobile station MS. However, the invention can also be applied with sub-stations which have access to a control channel and the base stations can radiate a unique frequency set for identification purposes in accordance with the inventive method.

Although the sub-stations are located indoors in the FIG. 2 embodiment it will be understood that sub-stations may also be located outdoors, for instance within a factory area. The aforesaid thirty reserved frequencies No1 up to and including No30 can be used to locate sub-stations in cells other than the cell C1, for instance in the cells C2 and C3. In the illustrated embodiment, the base stations and the sub-stations have adaptive assignment of traffic channels, although the inventive scope also includes permanent channel assignment. In the case of adaptive channel assignment in which the disturbance level of possible traffic channels is measured, the allocated identification frequencies No1–No30 may also be used for traffic by one of the sub-stations that uses the frequencies for identification purposes. This is possible when the disturbance level on one identification frequency lies beneath a stipulated largest value. In the exemplifying embodiment described with reference to FIG. 5, all of the signal strengths reported from mobile station MS were compared with the threshold value Th. However, it is possible to use several threshold values, for instance one threshold value for the common identification frequency No1 and another threshold value for the remaining identification frequencies.

The invention affords a number of advantages. As beforementioned, the sub-stations MT are relatively simple and the invention enables the location of a mobile station to be positively established. One important advantage is that the invention utilizes a function designated "Mobile Assisted Handoff" of certain existing mobile telephone systems. This function involves the mobile listening on a number of control channels from individual base stations and reporting some of the strongest signals to the mobile switching center. The center can thereby choose the most suitable base station for connection with the mobile station. According to the exemplifying embodiment of the invention, the "Mobile Assisted Handoff" function, such as that described in co-pending, commonly assigned U.S. patent application Ser. No. 07/673,592 is used to listen to the reserved frequencies No1–No30.

I claim:

1. A method for handing off a mobile station from an outdoor base station to an indoor base station in a mobile telephone system with a plurality of cells intended for indoor and outdoor use, and comprising an external part-system for outdoor use which includes external base stations connected to a mobile switching center, and an internal part-system for indoor use and having internal base stations connected to the mobile switching center, said mobile telephone system being allocated a plurality of frequencies for radio channels, said method comprising the steps of:

specifying a predetermined number of said allocated frequencies as identification frequencies for said indoor base stations;

selecting unique frequency sets from among said identification frequencies, each set comprising at least two frequencies;

assigning one of the unique frequency sets to each indoor base station each of said indoor base stations being assigned different frequency sets, wherein said indoor base stations transmit on their respective unique frequency set;

measuring in said mobile station the signal strengths of said identification frequencies;

reporting a number of said identification frequencies having a signal strength above a first threshold to the mobile switching center;

comparing the reported frequencies with said unique frequency sets;

selecting an indoor base station when an agreement is found between at least a subset of the reported frequencies and at least a subset of the indoor base stations unique frequency set;

assigning said selected indoor base station a traffic channel from among the frequencies including said identification frequencies; and handing off said mobile station to said selected indoor base station, wherein said mobile station communicates with said indoor base station on said assigned traffic channel.

2. A method according to claim 1, wherein the mobile station in addition reports signal strengths of the strongest frequency signals and the mobile switching center compares at least one of the signal strengths with a second threshold value, wherein said second threshold value is greater than said first threshold value.

3. A method according to claim 1, wherein each of the indoor base stations is assigned at least two of the unique frequency sets, these frequency sets being transmitted during at least two mutually separate locating periods.

4. A method according to claim 1, wherein the mobile station listens to the signal strengths of the identification frequencies for the duration of the connection with the selected indoor base station;

the mobile station reports a number of the identification frequencies having a signal strength above the first threshold to the mobile switching center;

the designations of the reported frequencies are compared with the unique frequency set for the selected indoor base station; and in the event of a deviation between the subset of the unique frequency and the subset of the reported frequencies, the connection is handed off from the selected indoor base station to one of the outdoor base stations that lacks a unique frequency set.

\* \* \* \* \*